May 7, 1935. A. H. NEULAND 2,000,786
ELECTRIC SYSTEM AND CONTROL FOR MOTOR VEHICLES AND OTHER PURPOSES
Filed Jan. 12, 1931 3 Sheets-Sheet 2

Witness
INVENTOR
A. H. Neuland

ACCELERATOR RELEASED   ACCELERATOR DEPRESSED

POWER FLOW LOAD TO ENGINE        POWER FLOW ENGINE TO LOAD
POWER FLOW FROM ENGINE INTERRUPTED   AUTOMATICALLY CONTROLLED
                                 FREE RUNNING LOAD TO ENGINE

*Fig. 4*

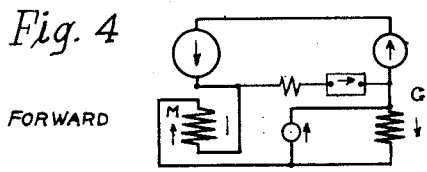

FORWARD

*Fig. 7*

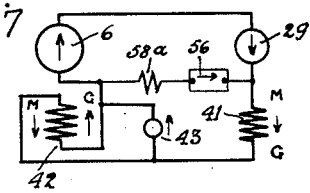

ENGINE STARTING
POWER FLOW INTERRUPTED
IN EITHER DIRECTION

*Fig. 5*

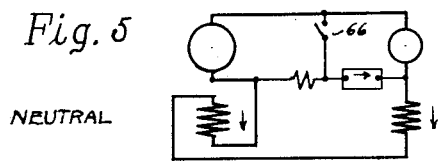

NEUTRAL

POWER FLOW LOAD TO ENGINE    POWER FLOW LOAD TO ENGINE

*Fig. 6*

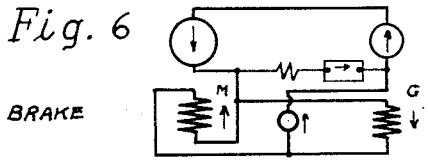

BRAKE

*Fig. 8*

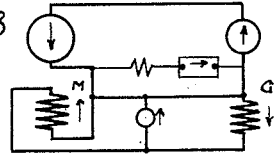

POWER FLOW ENGINE TO LOAD
IN REVERSE DIRECTION

*Fig. 9*

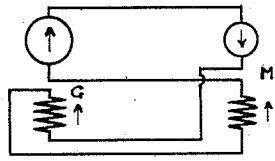

REVERSE

Witness
F. F. Stoll

INVENTOR.
A. H. Neuland

Patented May 7, 1935

2,000,786

UNITED STATES PATENT OFFICE 2,000,786

ELECTRIC SYSTEM AND CONTROL FOR MOTOR VEHICLES AND OTHER PURPOSES

Alfons H. Neuland, Irvington, N. J., assignor to Electrogear Corporation, a corporation of Delaware Application January 12, 1931, Serial No. 508,094

63 Claims. (Cl. 290—17)

My present invention relates to improved methods and means for transmitting power from a power source to a load and for variously controlling the power source and the load.

One object of the invention is to simplify and improve the operation and control of motor vehicles and to provide an improved and complete apparatus for accomplishing it.

Another object is to provide for certain relationships between the electrical elements of the system, between the gears of a differential gear train cooperating therewith, and between the electrical elements and the gearing, for supplying the load with a reverse torque substantially in excess of the prime mover torque.

Other objects are to provide an apparatus permitting a wide speed and torque range between prime mover and load and a control for varying the speed of an engine within wide limits with variations in the torque on the load.

Another object is to provide the combination of a regulating dynamo field coils and circuits operative in response to variations in the torque and speed of the load, to reverse current in one of the field coils.

Still another object of the invention is to provide a dampener, interposed between the engine and the load to prevent chattering in the gearing when the engine is rough or idles unevenly.

Still another object is to reverse the power flow between an engine and a load by movement of the throttle control mechanism.

Another object is to provide for a control mechanism normally capable of reversing the direction of load shaft rotation, and when deflected from the normal position, to lock the load shaft and to connect the transmission to a battery for starting the engine.

Still another object is to establish various field relationships in the transmission and to tease the transmission field coils from a battery for the purpose of aiding or preventing pick up or power flow between engine and load.

Another object is to provide a self-contained construction in which one of the transmission rotors is capable of serving as a fly wheel for the engine, a construction having a moderate overhang, one that permits combination with the engine to form a unit power plant and a construction which is capable of being connected to or removed from the engine as a unit.

Other objects and advantages of my invention will appear from the following detailed description and appended drawings of a preferred embodiment of my invention applied to a motor vehicle.

In my co-pending application Serial No. 359,031 filed April 29th, 1929, I am claiming certain features of my invention disclosed herein. These include the auxiliary dynamo for operating one dynamo as a motor under certain conditions and as a generator under other conditions, means responsive to variations in the speed of one shaft or to variations in the current in the load circuit for varying or for reversing the rotation of an element of a dynamo with respect to a stationary element, an auxiliary dynamo connected with one of the shafts and varying the speed of a shaft in response to the speed of the auxiliary dynamo, a battery for energizing one of the field elements, stabilizing the dynamo electric apparatus from a separate source, a housing enclosing gears, a housing secured to a power shaft, a rotatable armature having a gear housing, differential gearing within a gear housing, a bearing for aligning the gear housing with the transmission casing, a rotatable multi-part gear housing enclosing a gearing and having one of its parts secured to one of the shafts and tightly enclosed for retaining a lubricant, a rotatable multi-part gear housing having a bearing for aligning an armature with the gear housing, a bearing for aligning the gear housing and the armature with the transmission casing, a gear housing and differential gearing within a transmission casing, a bearing for aligning one end of an armature and one end of the gear housing with the transmission casing, and a bearing for aligning an end of an armature and a load shaft with the transmission casing.

In my copending application Serial No. 649,637 filed Dec. 30, 1932 and comprising a division of this application, I am claiming a feature of this invention directed to damping of engine impulses during the idling period to minimize gear noise and for other purposes.

Transmission apparatus, in order to be practical and of utility for use in motor vehicles or for other purposes, must be capable of supplying the load with a powerful reverse torque as well as a powerful forward torque. In my copending application, Serial #359,031, filed April 29, 1929, I have described an apparatus having two dynamos and a differential gearing for driving a load and have proposed to obtain a moderate reverse torque by shifting the brushes of the clutch dynamo. The reverse torque, which may thus be obtained with the combination described, is in many instances inadequate, and for that reason, a mechanical reverse gear is employed in combination with the apparatus, which, however, considerably complicates the device. In my Patent #1,773,845, dated August 26, 1930, I provide certain relationships between two dynamos by adjusting the brushes away from the neutral point on the commutator in order to obtain forward and reverse torques. However, the resulting imperfect commutation limits the reverse torque of such a combination. In accordance with the present invention, the production of a powerful reverse torque is accomplished by proportioning the booster dynamo so that its speed torque capacity, with a given speed of the power source and with load shaft at rest, substantially exceeds the speed torque capacity of the clutch dynamo. My invention also provides means for producing a powerful forward torque, comprising a reversing switch in combination with means adapted to weaken the booster field with respect to the clutch field and also adapted to vary the speed torque relationship between the shafts by automatically reversing the booster field.

Fig. 4 is a simplified circuit diagram with controller in forward position and accelerator pedal released.

Fig. 5 is a circuit diagram with controller in neutral.

Fig. 6 is a circuit diagram with controller in brake position and accelerator pedal released.

Fig. 7 is a circuit diagram with controller in forward position and accelerator pedal depressed.

Fig. 8 is a circuit diagram with controller in brake position and accelerator depressed.

Fig. 9 is a circuit diagram with controller in reverse position.

Figure 1:
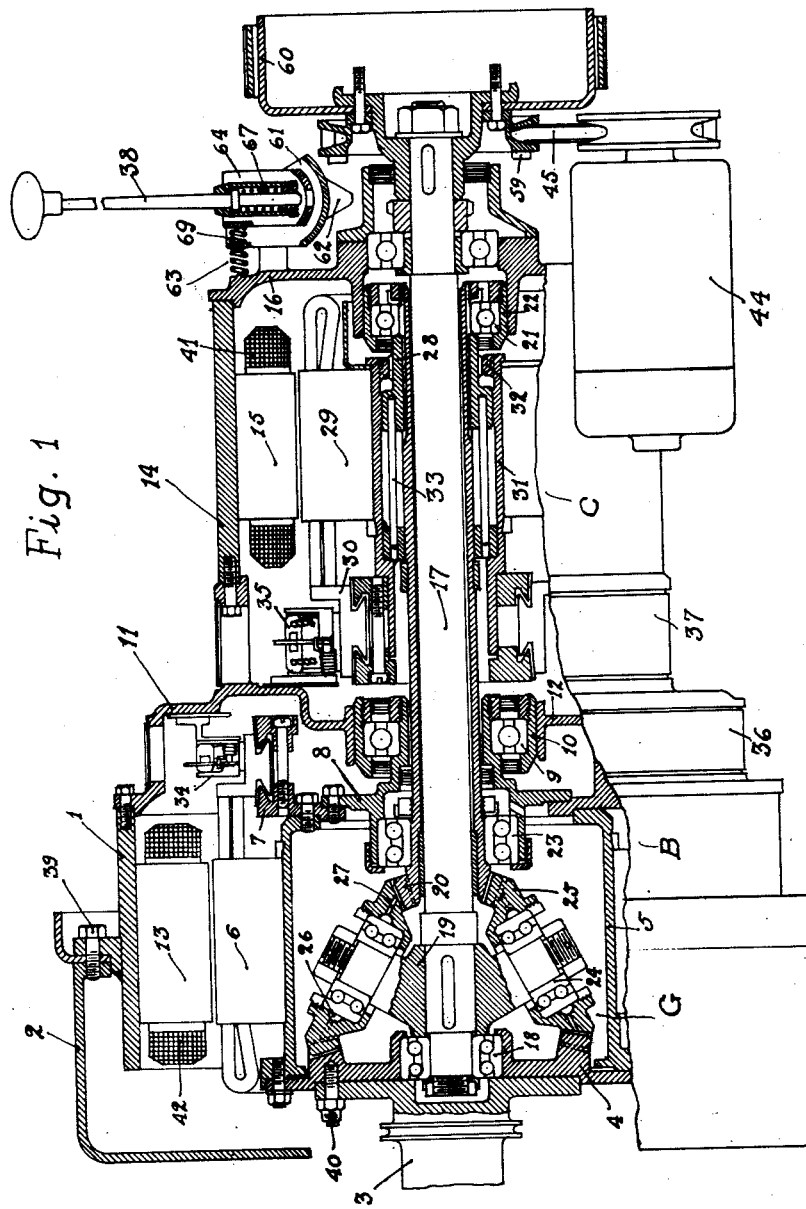
Figure 1 is in part a longitudinal section and in part a side elevation of the transmission, showing its detailed construction and method of combining with an engine to form a unit power plant.
Figure 2:
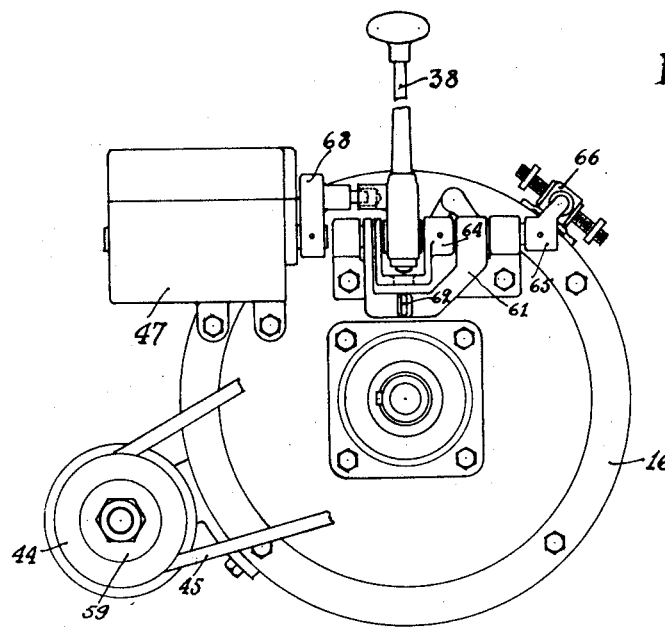
Fig. 2 is an end elevation of the rear part of the transmission with brake drum removed to expose the control lever and locking mechanism.

Referring to the figures, in which like numerals identify like elements, the transmission consists of a dynamo B, which will hereafter also be referred to as the booster, a second dynamo or clutch C and a differential gear train G. The booster field ring 1 is bolted to the bell housing 2 of an engine or power source having a shaft 3. A relatively large gear 4, which will hereafter be referred to as the engine gear or power gear, is bolted to the shaft 3. In accordance with my invention, I provide a rotor or armature 6 of relatively large diameter assembled on a drum 5 having one of its ends bolted to a flange on the gear 4, while the other end of the drum has a commutator 7 and a bearing carrier 8 bolted to it. A ball bearing 9 has its inner race locked on an extension of the carrier and its outer race disposed within the barrel 10. An intermediate bracket 11, bolted to the field ring 1 is provided, having a cylindrical portion 12 bored out to receive the barrel 10 for the purpose of aligning and rigidly suporting the rotor 6 with respect to the field poles 13. The bracket 11 also serves to carry the clutch field ring 14 having the pole pieces 15 bolted to it. A rear bracket 16 is also bolted to the field ring 14. I provide a propeller or a load shaft 17 extending thru the length of the transmission and having one of its ends journaled in the bracket 16 and having its other end locked within the inner end of a combined radial and thrust bearing 18 carried by and aligned with the gear case and the engine shaft 3. I also provide a gear 20 of relatively smaller diameter with respect to the engine gear 4 having a hollow extension or sleeve preferably arranged to form an integral part of the gear which surrounds the shaft 17 and which will hereafter also be referred to as the clutch gear or balancing gear. One end of the sleeve is supported by the bearing 21 disposed within the barrel 22 in the bracket 16 and the other end of the sleeve gear is supported by the combined radial and thrust bearing 23 locked within the carrier 8. A spider or gear carrier 19 is keyed to the shaft 17 and has combination thrust and radial bearings 24 secured to it for carrying the intermediate or load gears 25 preferably two in number arranged to mesh directly with the engine and sleeve gears. The intermediate gears will hereafter also be referred to as propeller gears and are provided with a groove or reservoir 26 and holes 27 connecting the reservoir with the spaces between the gear teeth. By these means the lubricant, which due to centrifugal force during engine rotation hugs the inner wall of the drum 5, is pumped into the holes and the reservoir and due to centrifugal force acting on the rotating gear 25, is expelled against the teeth of the sleeve gear 20, thereby keeping it lubricated.

I provide a clutch armature or rotor 29 which is connected with the gear 20 and rotated by the engine in reverse direction when the vehicle is at rest. The rotor and its commutator 30 have considerable inertia and tend to rotate at a uniform angular velocity while the explosions in the engine cylinders drive the engine shaft at a nonuniform angular velocity. This difference between the angular velocities of engine and armature causes surging and reversal of power in the gearing when the engine idles and the car is at rest, the engine shaft driving the armature one instant and making contact on one side of the gear teeth and the inertia in the armature driving the engine shaft the next instant and making contact on the other side of the gear teeth. This ordinarily results in vibration and chattering between the gear teeth which is transmitted to the propeller shaft and the vehicle whenever the car is at rest.

In order to dampen gear noise during the period when the engine idles without transmitting power to the vehicle wheels I provide a dampener to cushion the impact between the gear teeth due to differences in angular velocity between the engine shaft and the mass of the armature 29 which may be interposed at any suitable point between the propeller or engine shaft and the mass of the armature 29. The dampener may for the sake of convenience be built into the clutch armature itself and may take the form I have selected for illustration in which I provide a sleeve 28 securely splined to the sleeve of the gear 20 to rotate therewith. The clutch armature 29 and its commutator 30 are assembled on a sleeve 31 which at one point rests on the sleeve 28 and at another point has a collar securely attached to it resting on the sleeve of the gear 20. The sleeves 28 and 31 are provided with loosely fitted clutch teeth 32 so as to permit a certain amount of angular movement between the sleeves before the clutch teeth on one sleeve contact with the clutch teeth on the other sleeve. I also provide flexible members or springs 33 which may conveniently take the form of round spring rods having one of their ends inserted in holes drilled in the collar of the sleeve 31 and their other ends inserted in holes of the sleeve 28. The spring rods are aligned with the loosely fitted clutch teeth 32 on the sleeves 28 and 31 so that angular movement of the sleeve of the gear 20 with respect to the armature 29 will flex the spring rods 33 in one or the other direction before the clutch teeth 32 make contact with one another and establish a positive drive. This action of the springs cushions the impact between the teeth of the gears 4, 25 and 20, smoothens out the difference in angular velocity between clutch armature and engine shaft and thereby dampens gear noise whenever the engine idles and the vehicle is at rest.

In motor vehicles it is of importance that brushes be easily accessible for inspection or replacement and be unobstructed by the engine or elements of the transmission. I accomplish this requirement by arranging the commutators adjacent to each other and by securing the booster brushes 34 and the clutch brushes 35 to the bracket 11 common to both. It is seen that this bracket is unobstructed and permits easy removal of the cover bands 36 and 37 for inspection of the brushes thru openings in the bracket. My construction enables me to bolt the front of the transmission securely to the engine block; it leaves the rear of the transmission free for the mounting of control devices, it permits the control lever 38 to be brought out directly and within easy reach of the operator and it further permits the entire assembly to be self contained and of unitary construction for attachment to the engine to form a unit power plant, removal of the bolts 39 and 40 sufficing to remove the transmission from the engine as a unit.

In my copending application, Serial #359,031, filed April 29, 1929, I have disclosed an apparatus similar to the one here shown. Some of the objects of the present invention are to provide an improved combination of elements to secure rigidity and quiet operation in the gearing and in the transmission as a whole, to reduce the overall length and to dispense with a separate fly wheel. I attain these objects by arranging the differential gearing adjacent to the engine shaft and within the booster armature. The weight of the armature 6 serving to supply the needed fly wheel inertia for the engine as well as to effectively dampen vibrations that may be set up by the gearing. I also provide a clutch armature of smaller diameter with respect to the booster armature as well as a relatively small clutch gear with respect to the engine gear, which permits a substantial reduction in the weight of the transmission. I further provide means for operating the clutch armature in one stage at speeds greatly in excess of the engine speed for effecting an extraordinary range in torque and speed between engine and load which I shall hereafter more fully describe.

Figure 3:
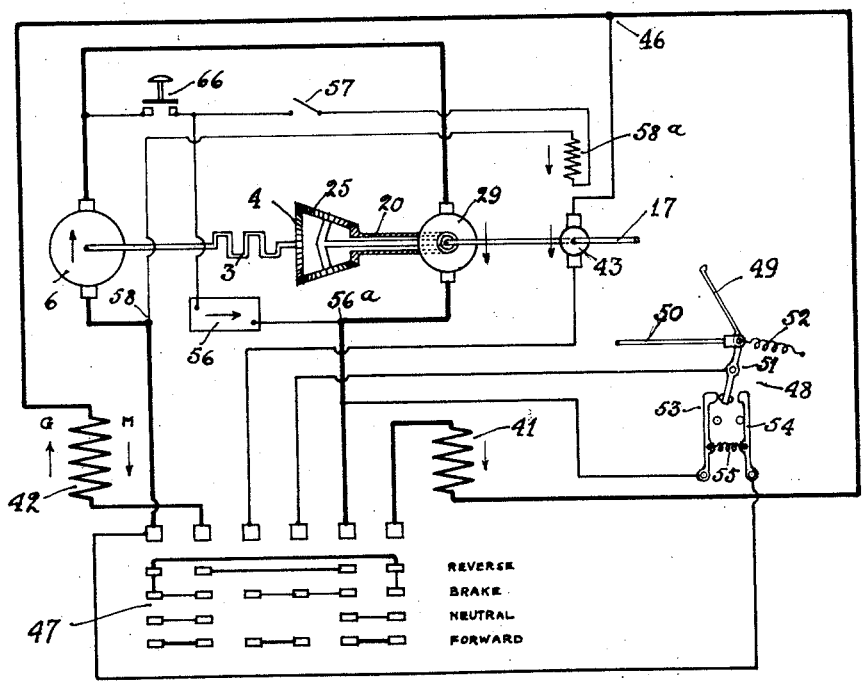
Fig. 3 is a diagram showing particularly the arrangement of electric circuits and circuit controls.

Turning now to the circuit diagram and controls, the heavy line in Fig. 3 represents the main load circuit including the booster and clutch armatures 6 and 29 respectively, as well as the clutch field coil 41. The booster field coil 42 is also connected in the circuit and adapted to be traversed by current in either direction. This is accomplished by the armature 43 of the regulating dynamo 44 which is secured to the rear of transmission and is preferably driven from the load shaft 17 by some means such as the belt 45. One brush of the regulator is connected to the junction point 46 and the other brush is preferably connected to the controller 47. I also provide an auxiliary control switch 48, which is preferably operated by movement of the accelerator pedal 49 connected with the engine throttle, not shown, by means of the rod 50. The switch is pivoted at the point 51 and held in the released position shown by the spring 52 contacting with the finger 53 and when depressed contacting with the finger 54; the spring 55 serving to close both fingers as the contact is shifted from one finger to the other. I further provide teasing means for assisting or preventing pick up of the system, depending on the position of the controls, which includes a battery 56 having one terminal connected to the junction point 56a and the other thru a switch 57 to the junction point 58. The teaser circuit may preferably include the field coil 58a to excite the regulator, and to simultaneously limit the teaser current operative to vary the regulator excitation in response to current variations in the load circuit.

Other means may be used for stabilizing and teasing, such as described and shown in my copending application Ser. No. 294,993 now Patent No. 1,820,862 dated August 25, 1931 and in my co-pending application Ser. No. 292,194 now Patent No. 1,820,863 dated August 25, 1931, and in my copending application Ser. No. 359,031, filed April 29, 1929.

I also provide improved means for utilizing the transmission to start the engine from a battery and a mechanism which permits the controller 47 and the starting means to be operated by a single lever. It consists of a toothed flange which may conveniently be made a part of the pulley 59 bolted to the brake drum 60 and secured to the end of the load shaft 17. The pivoted member 61 is provided with a finger 62 which may engage the teeth on the pulley and lock the load shaft, but is normally held out of engagement by the spring 63. The pivoted member 64 is arranged to operate the lever 65 thru a jack shaft and to close the starting switch 66. The control lever 38 is pivoted independently of the members 61 and 64 and normally held in an upward position by the spring 67. The control lever engages with an arm 68 pinned to the shaft of the controller 47 and operates to move the controller drum to various positions.

To start the engine the lever is pushed down to engage with the hole in the member 64 and is pushed forward bringing the controller to neutral position and simultaneously closing the switch 66. With the aid of the spring 69, the movement of member 64 is transferred to member 61. This locks the load shaft and permits the transmission to exert a powerful torque for starting the engine. After the engine has started the operator releases the lever, which immediately unlocks the load shaft, opens the starting switch and leaves the controller in the neutral position, from which it may be moved to the various operating positions without interfering with the starting mechanism.

With the controller in neutral position, a closed circuit is established, as shown more clearly in the simplified diagram of Fig. 5. The clutch field is connected in generating direction for rotation of its armature in a direction opposed to engine rotation, while the booster field coil is connected for motoring operation of booster. These connections are the same as for forward operation shown in Fig. 4 and Fig. 7, except that the regulator is excluded from the circuit.

I use a relatively large booster with respect to the clutch to prevent building up of current in the circuit and flow of power in either direction between engine and load shafts. The teaser current from the battery traverses the fields in the direction of the arrows, but since the potential of the booster due to teaser field exceeds and opposes the clutch potential, any slight current flowing in the load circuit will have a tendency to diminish. Consequently, the engine may be operated at any speed without danger of starting the car, and while the controller remains in this position, the car free wheels and its motion is unimpeded by engine drag.

When the controller is moved to forward position the circuits shown in Fig. 4 are established. The switch 48 is in the position shown in Fig. 3 with the regulating dynamo connected across the clutch field. With this connection no power can flow from engine to load even though the booster were relatively smaller with respect to the clutch for the reason that so long as the load shaft and regulator are not in motion, the regulator operates to shunt current away from the clutch field and so prevents the clutch from generating a predominating voltage, without which current in the load circuit cannot build up and the car cannot move. The teaser current again traverses the field coils, but due to the shunting of the clutch field coil is even more effective in preventing pick up than heretofore described in connection with the neutral position.

To start the car, the switch 48 is moved so as to open contact 53 and close contact 54. While the switch 54 may be operated in any suitable manner, I prefer to operate it by movement of the accelerator or engine throttle mechanism as illustrated. This connects the regulator 43 across the booster field coil 42 as shown by the circuit diagram of Fig. 7 and shunts the teaser current and later the load current away from the booster field coil. The reversely rotating clutch armature now generates a predominating voltage and immediately builds up a load current in the circuit which traverses the booster, and causes it to operate as a motor and to produce a torque in aid of engine torque. I provide for a predetermined forward stall torque increase ratio between engine and load, and establish the requisite torque relationships between booster and clutch by judiciously selecting the regulator or shunt resistance with respect to the resistance of the booster field coil. Whenever the car is stalled a full depression of accelerator will build up the torque at the load shaft to its maximum value. As the car gets under way and the propeller shaft speeds up, the regulator armature 43 generates a potential in direction of the load current flowing thru it. This potential increases as the propeller shaft and the car speed up and operates to shut or deflect an increasingly larger proportion of current away from the booster field coil and to weaken the booster potential and torque until the generated regulator potential equals the internal regulator voltage drop, when the entire load current flows thru regulator and current thru booster field coil has ceased. A further increase in the speed and voltage of the regulator causes the regulator to send a current thru the booster field coil in the opposite direction and as shown by the arrow G. The booster has automatically changed from a motor to a generator without interruption of power flow from engine to load. The regulator is now traversed by the sum of the load and booster field currents; but in spite of this fact, the size of the regulator is very small compared with the size of the clutch and booster units, since it cooperates with a field coil of very low resistance and is therefore wound for a correspondingly low voltage. My system also varies and controls the engine speed in response to current changes in the load circuit and is particularly effective in connection with the illustrated embodiment in which the booster is connected to the engine shaft and the clutch is provided with a series field winding, which results in an extraordinary current variation in the main load circuit, including the clutch field coil, for any given throttle opening, as the load shaft speed varies between stall and full speed. Consequently, during acceleration, with full throttle for instance, due to operation of regulator, as described, load current in the main circuit rapidly diminishes as the car speeds up and current thru regulator may also diminish, but at a lesser rate, even though it shunts current away from booster field coil and subsequently is traversed by the booster field current in addition to the load current. As a result, the diminishing internal voltage drop in the regulator cooperates with the increasing generated regulator potential in hastening a reversal of current in the booster field coil. When the car has accelerated to the desired speed and the operator wishes merely to maintain this speed, he partly releases the accelerator and thereby diminishes the torque delivered to the propeller and load. The lighter load immediately reflects in a diminished current in the main load circuit, and as under certain conditions the current thru the regulator may remain unchanged for any given car and propeller speed, the decreased current in the load circuit is accompanied by an increased current thru booster field coil whenever booster operates as a generator, strengthening its field. This results in a greater booster and lesser clutch voltage, which in combination with the greater torque demand by booster and the lesser torque ability of the engine substantially reduces the engine speed with respect to the propeller speed. In the illustrated embodiment I prefer to connect the field coil of the regulator to the main circuit, so as to vary the regulator field excitation in response to variations of the load current in the main circuit. As the load current diminishes due to a change in car speed or throttle opening, the potential impressed on the regulator field is increased by the amount of the reduced voltage drop across the booster and clutch field coils and results in a still stronger booster field and further reduction of engine speed.

For reasons heretofore mentioned, I employ a relatively powerful booster with respect to the clutch, capable of driving the clutch armature at speeds greatly exceeding that of the engine. This combination permits a substantial reduction in the weight of the clutch unit and the transmission as a whole for the reason that it permits the use of a relatively high ratio rear axle, as for instance 5–1, without requiring excessive engine speed, as the relatively high speed clutch armature is capable of driving the propeller shaft thru the gearing at speeds exceeding the engine speed, to compensate for the higher axle ratio and when the load is light, to operate the engine at unusually low speeds, as heretofore described. It is of importance in a transmission of this nature that the gearing operate for long periods without overhaul. The ability of my system to use a relatively high rear axle gearing ratio reduces the torque the propeller must develop for any given wheel torque, lightens the load on the transmission differential gearing and reduces the velocity between the gear teeth during periods of heavy load, as for instance when engine and propeller operate at the same speed, the wheel torque, due to the relatively high axle ratio, is correspondingly large, but relative motion between the gearing has at this moment ceased. Generally the load is lightest when the gearing velocity is greatest, as for instance, during overspeeding above described. This represents an ideal operating condition for the gearing and greatly improves its utility. The relatively large booster has the advantage of requiring only a moderate exciting current from the regulator and can be made to operate with low magnetic core densities and losses, all of which is made possible by the combination heretofore described.

As long as the switch 48 makes contact with the finger 54, power may flow from engine to load shaft, but cannot flow from load shaft to engine, as a consequence of which the car is capable of free wheeling, that is, its free motion is unimpeded by the engine, and the engine is permitted to slow down to an idling speed for economy and saving in wear and tear, when power is not needed. However, it is often desirable to utilize engine drag or friction for retarding the car, as for instance, when descending a grade. This my system accomplishes by switching the excitation from the booster field coil to the clutch field coil, which in the illustration is accomplished by the switch 48. The change from free wheeling to retardation with the aid of engine drag is preferably accomplished by movement of the accelerator pedal 49, which may be adjusted to provide sufficient movement for changing contact between fingers 53 and 54 without substantially opening the engine throttle. From the current direction arrows in Fig. 4, it is seen that whenever the accelerator is completely released and regulator is supplying current to clutch field coil 41, the current in the armatures has reversed, the clutch operates as a generator and the booster as a motor. The motoring operation of the booster at this moment is important in that it prevents shock to the system and the gearing whenever the accelerator is suddenly released during high car speed as the booster exerts a direct torque upon the engine shaft in addition to the indirect torque supplied thru the gearing by clutch reaction. The regulator at this stage also operates in the manner heretofore described, as a relatively large load current is automatically accompanied by a reduced current thru clutch field, which limits the engine drag load current to a safe value. From the foregoing, it is seen that the control of engine and vehicle is accomplished automatically. The operator need only variously depress the accelerator in order to meet the various requirements for the operation of the vehicle. When the car is in motion and the accelerator is partly released, the car free wheels and engine slows down to its idling speed, and if accelerator is entirely released power flow is established from load shaft to the engine, the engine is speeded up and the drag produced thereby retards the car. My system prevents the engine from becoming stalled when the car is brought to a stop and prevents the car from creeping, even if the engine idles at a good speed. A light depression of accelerator suffices to develop a torque at the load shaft, which will hold the car on a grade or start it on a level road without jerk or shock, and when the accelerator is fully depressed the torque builds up as heretofore described, and accelerates the car at a vigorous rate, the engine speeding up at a relatively high rate with respect to propeller during the first stage and at a relatively lower rate thereafter as the regulator activity increases. After the car has accelerated to the desired speed and the accelerator is partly released, the engine supplies the lesser required power at greatly reduced and economical speeds.

For descending steep grades my system provides for increased retardation without recourse to the vehicle brakes. This is accomplished by moving the control lever to the brake position, which establishes the circuit shown in Fig. 6 when the accelerator is released and the circuit shown in Fig. 8 when the accelerator is depressed. It is seen that the current flows thru armatures in reverse direction and divides between the clutch and booster field coils, causing the clutch to operate as a generator and the booster as a motor. The regulator at this time aids to energize both units and when accelerator is depressed, as in Fig. 8, it serves to furnish the entire excitation to the field coils. By these means the load is made to vigorously speed up the engine, the increasing engine friction serving to substantially retard the vehicle.

I have heretofore pointed out that my combination is capable of producing a powerful reverse torque. For this purpose the relatively powerful booster and small clutch are of great importance, as are the relatively high ratios between the clutch and engine gears and in the rear axle as the gear ratios determine the size of the clutch and enable me to provide the needed preponderance in the power of the booster over the clutch and still keep the weight of the transmission within practical limits. The production of a powerful stall torque on load shaft, especially if it is to build up to double or more the engine torque capacity, requires a large current in the main circuit and a considerable $I^2R$ voltage to force the current thru the load circuit. I proportion the power of the booster so that its torque speed capacity during reverse operation exceeds that of the clutch by at least thirty per cent. and thereby supplies the $I^2R$ voltage to the system, in addition to the counter potential developed by the clutch. It should be noted that, generally, the smaller the preponderance of booster over clutch capacity, the greater the torque multiplication. However, in a self excited system, as above described, a booster predominance of much less than thiry per cent. is generally accompanied by lack of stability, excessive engine speeds, or failure to build up at all. In the illustrated embodiment suitable for an engine of about 75 H. P., the booster exceeds the speed torque capacity of the clutch by about 50% and will develop a torque about double the torque capacity of the engine. The torque capacity of the booster, however, in the illustrated embodiment is approximately 400% greater than that of the clutch. This is due to the relatively high ratio in the differential transmission gearing and the direct conection of the booster to the engine in my prefered embodiment above described.

In addition to the requisite relationship between the booster and clutch torque speed capacities above described, the booster and clutch field coils must be reversed with respect to their armatures as shown by the simplified diagram in Fig. 9 for reverse operation. The booster now operates as a generator and the clutch as a motor and, assuming an engine gear with 35 teeth a clutch gear with 15 teeth, an engine torque of 100 foot pounds, and a reverse torque at the propeller at stall of 200 foot pounds to be produced, the clutch must be proportioned to develop $$200 \times \frac{15}{15+35} = 60 \text{ foot pounds}$$

The resultant reaction at the engine gear is $$200 \times \frac{35}{35+15} = 140 \text{ foot pounds}$$

in direction of engine rotation, and since this torque combines with the torque produced by the engine the booster, if direct connected with the engine as in the illustrated embodiment, must absorb $$140 + 100 = 240 \text{ foot pounds}$$

which represents four times the torque developed by the clutch. The electrical units must also be proportioned so that their losses do not exceed the power which the engine is capable of developing when operating at a speed at which the requisite maximum propeller stall torque is to be produced. When the car is at rest and the engine idles, its speed is not sufficient to build up a torque to move the car or to stall the engine. As soon as the engine speed is increased, the torque is built up. This enables the operator to apply and interrupt power and to start the car in a reverse direction similarly as heretofore described in connection with forward operation.

While I have herein shown a complete system embodying my invention and described its operation in connection with a motor vehicle, I desire to have it understood that my invention is adapted for other uses and that it may be used in whole or in part, depending upon the requirements to be met, in the described or other embodiments within the principle and scope of my invention, and I desire that only limitations required by the prior art or the appended claims be imposed upon it.

I claim:

1. In combination, an engine having an engine block and a shaft, a field system secured to the engine block, a hollow armature secured to the engine shaft arranged within the field system to form a gear case and provided with a commutator, a second armature having a commutator arranged adjacent to the commutator of the first armature, a load shaft extending thru the second armature and into the gear case, a gearing arranged adjacent to the engine shaft and within the gear case operative to connect the engine shaft with the load shaft and with the second armature, and means for varying the speed of one armature with respect to the speed of the other armature for variously driving the load shaft.

2. The means for driving a load in forward and reverse directions which includes an engine having a shaft, a load shaft, a dynamo rotatively connected with both shafts having armature and field elements, a second dynamo rotatively connected with the engine shaft including a field element independent of the first dynamo and an armature having a substantially superior power capacity with respect to the armature of the first dynamo, field coils for energizing the field elements from one of the dynamos, connections for developing power in the second dynamo substantially superior to that developed in the first dynamo for operation of load shaft in reverse direction with respect to engine shaft, and a switch for reversing the connections between the armatures of both dynamos with respect to their field coils and for developing power in the second dynamo substantially inferior to that in the first dynamo for operation of the load shaft in a forward direction with respect to engine shaft.

3. The means for driving a load in forward and reverse directions which includes an engine having a shaft, a load shaft, gearing interposed between the shafts, a dynamo rotatively connected with the gearing having armature and field elements, a second dynamo rotatively connected with the engine shaft having armature and field elements independent of the first dynamo and of substantially superior power capacity with respect to the power capacity of the first dynamo, a plurality of field coils for energizing the field elements from one of the dynamos, connections for developing power in the second dynamo substantially superior to that developed in the first dynamo for operation of load shaft in reverse direction with respect to engine shaft, and a switch for reversing the connections between the armatures of both dynamos with respect to their field coils and for developing power in the second dynamo substantially inferior to that in the first dynamo for operation of the load shaft in a forward direction with respect to engine shaft.

4. In combination, an engine having a shaft, a load shaft, a differential gearing interposed between the shafts, a dynamo operatively connected with the differential gearing having an armature and a field coil, a second dynamo operatively connected with the engine shaft having a field element and an armature of substantially superior power capacity with respect to that of the armature of the first dynamo, a field coil for energizing the field element of the second dynamo, electric connections for establishing a relatively strong magnetomotive force in the field element and for driving the load shaft in reverse direction with respect to engine shaft, means for reversing both armatures with respect to their field coils and means for establishing a relatively weak magnetomotive force in the field element for driving the load shaft in forward direction.

5. In combination, an engine having a shaft, a load shaft, a differential gearing interposed between the shafts, a dynamo operatively connected with the differential gearing having an armature and a field coil, a second dynamo operatively connected with the engine shaft having a field element and an armature of substantially superior power capacity with respect to that of the armature of the first dynamo, a field coil for energizing the field element of the second dynamo, electric connections for establishing a relatively strong magnetomotive force in the field element for driving the load shaft at a speed above that of the engine, and means for weakening the magnetomotive force in the field element for driving the load shaft at a speed below that of engine and for reversing the magnetomotive force in said field element for developing a torque at the load shaft substantially above that supplied by the engine.

6. In combination, an engine having a shaft, a load shaft, a dynamo operatively connected with the engine shaft having an armature and a field coil, a second dynamo operatively connected with the load shaft having an armature and a field coil, an electric circuit including both armatures and both field coils, and a regulating dynamo electrically connected in shunt with the field coil of the first dynamo operative to vary the field current of the first dynamo with respect to the field current of the second dynamo.

7. In combination, an engine having a shaft, a load shaft, a dynamo operatively connected with the engine shaft having an armature and a field coil, a second dynamo operatively connected with the load shaft having an armature and a field coil, an electric circuit including both armatures and both field coils, and means, including a regulating dynamo electrically connected in shunt with the field coil of the first dynamo, operative to vary the field current of the first dynamo with respect to the field current of the second dynamo in response to variations in the speed of one of the shafts.

8. In combination, an engine having a shaft, a load shaft, a dynamo operatively connected with the engine shaft having an armature and a field coil, a second dynamo operatively connected with the load shaft having an armature and a field coil, an electric circuit including both armatures and both field coils, and means, including a regulating dynamo electrically connected in shunt with the field coil of the first dynamo, operative to vary the field current of the first dynamo with respect to the field current of the second dynamo in response to variations in the torque on the load shaft.

9. In combination an engine having a shaft, a load shaft, a dynamo operatively connected with the engine shaft having an armature and a field coil, a second dynamo operatively connected with the load shaft having an armature and a field coil, a load circuit including both armatures and both field coils, a regulating dynamo having a field element and an armature electrically connected with one of the field coils, means for exciting the field element, and means for varying the excitation of the field element in response to variations of the current in the load circuit.

10. In combination, an engine having a shaft, a load shaft, a dynamo operatively connected with the engine shaft having an armature, a second dynamo operatively connected with the load shaft having an armature and a field element, an electric circuit including both armatures, a regulating dynamo operatively connected with one of the shafts, and means for energizing the field element from one of the armatures for driving the load shaft from the engine shaft and for energizing the field element from the regulating dynamo for driving the engine shaft from the load shaft.

11. In combination, an engine having a shaft, a load shaft, a dynamo operatively connected with the engine shaft having an armature and a field element provided with a series field coil, a second dynamo operatively connected with both shafts having an armature and a field element provided with a series field coil, a source of current, an electric load circuit including the armatures and the field coils, an auxiliary teaser circuit including both field coils and the source of current for maintaining a slight magnetization in the field elements when load current ceases, and means for shunting the field coil of the first dynamo operative to build up power flow from engine shaft to load shaft.

12. In combination, an engine having a shaft, a load shaft, a dynamo operatively connected with the engine shaft having an armature and a series field coil, a second dynamo operatively connected with the power shaft and with the load shaft having an armature and a series field coil, a source of current, means including electric connections between the dynamos forming with the armatures and field coils a closed load circuit for variously driving the load shaft and for interrupting power flow between the shafts when engine speed is reduced, and an auxiliary teaser circuit including both field coils and the source of current operative to maintain a slight current in the field coils when engine speed is relatively low and to build up load current and power flow between the shafts when engine speed is increased.

13. In combination, an engine having a shaft, a load shaft, a dynamo operatively connected with the engine shaft having an armature and a field coil, a second dynamo operatively connected with both shafts having an armature and a field coil, a storage battery, a controller for changing the connections between the armatures and the field coils for operation of load shaft in forward and reverse directions, means for locking the load shaft against rotation, a switch for connecting the battery with one of the dynamos for starting the engine, and a lever normally engaging to move the controller to various positions and when deflected from the normal position operative to engage said locking means and to close the switch for starting the engine.

14. In combination, an engine having a throttle and a shaft, a load shaft, two electrically interconnected dynamos for transmitting power between the shafts, a switch connected with the dynamos and arranged to be operated in response to throttle changes, and means controlled by said switch for effecting the driving of the load shaft from the engine shaft when the switch is in one position and for driving the engine shaft from the load shaft when the switch is in another position.

15. In combination, an engine having a throttle operating mechanism and a shaft, a load shaft, means including two electrically interconnected dynamos for transmitting power between said shafts, a switch operable in response to movement of said throttle operating mechanism, and means controlled by said switch and operable to control said dynamos for effecting the driving of said load shaft from said engine shaft when said switch is in one position and for effecting the driving of said engine shaft from said load shaft when said switch is in another position.

16. In combination, an engine having a throttle mechanism and a shaft, a load shaft, means including two electrically interconnected dynamos for transmitting power between said shafts, a switch connected with said dynamos and with said throttle mechanism, a source of current connected with said dynamos and with said switch, and means including said source and said switch operable in response to the movement of said throttle mechanism for driving said load shaft from said engine shaft when said switch is in one position and for driving said engine shaft from said load shaft when said switch is in another position.

17. The means for driving a load in forward and reverse directions which includes an engine having a shaft, a load shaft, gearing interposed between the shafts, a dynamo rotatively connected with the gearing having armature and field elements, a second dynamo rotatively connected in fixed speed relation with the engine shaft having armature and field elements independent of the first dynamo and of substantially superior power capacity with respect to the power capacity of the first dynamo, a plurality of field coils for energizing the field elements from one of the dynamos, connections for developing power in the second dynamo substantially superior to that developed in the first dynamo for operation of load shaft in reverse direction with respect to engine shaft, and a switch for reversing the connections between the armatures of both dynamos with respect to their field coils and for developing power in the second dynamo substantially inferior to that in the first dynamo for operation of the load shaft in a forward direction with respect to engine shaft.

18. In combination, an engine having a shaft, a load shaft, a differential gearing interposed between the shafts; a dynamo operatively connected with the differential gearing having an armature and a field coil, a second dynamo operatively connected in fixed speed relation with the engine shaft having a field element and an armature of substantially superior power capacity with respect to that of the armature of the first dynamo, a field coil for energizing the field element of the second dynamo, electric connections for establishing a relatively strong magnetomotive force in the field element and for driving the load shaft in reverse direction with respect to engine shaft, means for reversing both armatures with respect to their field coils and means for establishing a relatively weak magnetomotive force in the field element for driving the load shaft in forward direction.

19. The means for driving a load at speeds less than that of an engine in one stage and at speeds exceeding that of an engine in another stage and for supplying the load with smooth power during changes from one stage to the other which includes an engine having a shaft, a load shaft, differential gearing interposed between the shafts, a dynamo rotatively connected with the gearing having armature and field elements, a second dynamo rotatively connected in fixed speed relation with the engine shaft having armature and field elements of substantially superior power capacity with respect to the power capacity of the first dynamo, means for magnetizing the field element of first dynamo from one of the dynamos substantially in accordance with the load on the load shaft, and means for variously operating the second dynamo as a weak motor in the first stage, for reversing the magnetization of the field element of the second dynamo for operation as a weak generator in the second stage to drive load shaft below the speed of engine shaft and for increasing said reversed magnetization for operation as a strong generator in the third stage to drive load shaft substantially above the speed of the engine shaft.

20. In combination, an engine having a shaft, a load shaft, a differential gearing interposed between the shafts, a dynamo operatively connected with the differential gearing having an armature and a field coil, a second dynamo operatively connected in fixed speed relation with the engine shaft having a field element and an armature of substantially superior power capacity with respect to that of the armature of the first dynamo, a field coil for energizing the field element of the second dynamo, means including electric connections for establishing a relatively strong magnetomotive force in the field element for driving the load shaft at a speed above that of the engine in one forward stage, for weakening the magnetomotive force in the field element for driving the load shaft at a speed below that of engine in another forward stage, for reversing the magnetomotive force in said field element for developing a torque at the load shaft substantially above that supplied by the engine in still another forward stage and for smoothly varying the speed of the load shaft with respect to the speed of the engine shaft between stages.

21. In combination, an engine having a shaft, a load shaft, a dynamo operatively connected in fixed speed relation with the engine shaft having an armature and a field coil, a second dynamo operatively connected with the load shaft having an armature and a field coil, an electric circuit including both armatures and both field coils all connected in series circuit relation, and means including a regulating dynamo mechanically connected with one of the shafts and electrically connected in shunt with the field coil of the first dynamo operative by variations in the speed of the regulating dynamo to vary the field current of the first dynamo with respect to the field current of the second dynamo.

22. In combination, an engine having a shaft, a load shaft, a dynamo operatively connected in fixed speed relation with the engine shaft having an armature and a field coil, a second dynamo operatively connected with the load shaft having an armature and a field coil, an electric circuit including both armatures and both field coils all connected in a series circuit relation, and means, including a regulating dynamo mechanically connected with one of the shafts and electrically connected in shunt with the field coil of the first dynamo, operative to vary the field current of the first dynamo with respect to the field current of the second dynamo in response to variations in the speed of one of the shafts.

23. In combination, an engine having a shaft, a load shaft, a dynamo operatively connected in fixed speed relation with the engine shaft having an armature and a field coil, a second dynamo operatively connected with the load shaft having an armature and a field coil, an electric circuit including both armatures and both field coils all connected in series circuit relation and means, including a regulating dynamo mechanically connected with one of the shafts and electrically connected in shunt with the field coil of the first dynamo, operative to vary the field current of the first dynamo with respect to the field current of the second dynamo in response to variations in the torque on the load shaft.

24. In combination an engine having a shaft, a load shaft, a dynamo operatively connected in fixed speed relation with the engine shaft having an armature and a field coil, a second dynamo operatively connected with the load shaft having an armature and a field coil connected in series circuit relation, a load circuit including both armatures and both field coils, a regulating dynamo having a field element and an armature electrically connected with one of the field coils, means for exciting the field element, and means for varying the excitation of the field element in response to variations of the current in the load circuit.

25. In combination, an engine having a shaft, a load shaft, a dynamo operatively connected in fixed speed relation with the engine shaft having an armature, a second dynamo operatively connected with the load shaft having an armature and a field element, an electric circuit including both armatures, a regulating dynamo operatively connected with one of the shafts, and means for energizing the field element from one of the armatures for driving the load shaft from the engine shaft and for energizing the field element from the regulating dynamo for driving the engine shaft from the load shaft.

26. The means for transmitting power in either direction between an engine and a load which includes an engine shaft, a load shaft, a dynamo connected in fixed speed relation with the engine shaft having an armature and a field coil, a second dynamo connected with the load shaft having an armature and a field coil, means for connecting the field coils in series circuit relation with each other and in series circuit relation with said armatures, a regulating dynamo, and means for connecting the regulating dynamo in parallel circuit relation with the field coil of first dynamo for driving the load shaft from the engine shaft and for connecting the regulating dynamo in parallel circuit relation with the field coil of the second dynamo for driving the engine shaft from the load shaft.

27. The means for transmitting power in either direction between an engine and a load which includes an engine shaft, a load shaft, a dynamo connected in fixed speed relation with the engine shaft having an armature and a field coil, a second dynamo connected with the load shaft having an armature and a field coil, means for connecting the field coils in series circuit relation with each other and in series circuit relation with said armatures to permit each dynamo to operate as a motor in direction of engine rotation, a regulating dynamo, and means for connecting the regulating dynamo in parallel circuit relation with the field coil of first dynamo for driving the load shaft from the engine shaft and for connecting the regulating dynamo in parallel circuit relation with the field coil of the second dynamo for driving the engine shaft from the load shaft.

28. The means for controlling power flow between two shafts which includes an engine having a shaft and a throttle control mechanism, a load shaft, a motor connected in fixed speed relation with one of the shafts having an armature and a field coil, a generator connected with the other shaft having an armature and a field coil, means for connecting both armatures and both field coils in series circuit relation with each other, a regulating dynamo adapted to shunt the motor field coil, and means including a switch for shunting the motor field coil with the regulating dynamo and establishing power flow between the shafts when the throttle control mechanism is moved in one direction and for substantially opening the motor field coil shunt and interrupting power flow when the throttle control mechanism is moved in another direction.

29. The means for variously controlling power flow in a motor vehicle by manipulations of the engine throttle which includes an engine having a shaft and a throttle mechanism, a load shaft, a dynamo connected in fixed speed relation with the engine shaft having an armature and a field coil, a second dynamo connected with the load shaft having an armature and a field coil, means for connecting both armatures and both field coils to form a series circuit, a regulating dynamo adapted to be traversed by a substantial portion of the load current and means including the regulating dynamo operative to energize the field coil of second dynamo and to permit power flow only from load shaft to engine shaft when the throttle is substantially closed and further operative to energize the field coil of first dynamo and to permit power flow only from engine shaft to load shaft when the throttle is opened.

30. The means for controlling the application and interruption of power between an engine and a load by movement of the engine throttle control mechanism which includes an engine having a throttle control mechanism and a shaft, a load shaft, a dynamo connected in fixed speed relation with the engine shaft having an armature, a field element and a field coil, a second dynamo having an armature and a field coil, means for connecting the field coils in series circuit relation with each other and with the armatures, a differential gearing connected with the shafts and with the second dynamo adapted to cooperate with the dynamos for transmitting power between the shafts, a separate source of current for maintaining a slight magnetization in the field element, and means including a switch operated in response to movement of the throttle control mechanism to permit the current in the transmission to build up when the switch is in one position and to make the transmission ineffective when the switch is in another position.

31. The means for operating a load in forward and reverse directions which includes an engine having a shaft, a load shaft, a dynamo connected in fixed speed relation with the engine shaft having a field element and an armature, a second dynamo, a differential gearing connected with the shafts and with the second dynamo and adapted in cooperation with the dynamos to transmit power between the shafts, an exciter, and means including a control switch and circuit connections therefor for energizing the field element from the armature of the first dynamo in one direction to drive the load shaft in reverse direction with respect to engine shaft, for energizing the field element from the armature of second dynamo in the opposite direction to drive the load shaft at a relatively low speed with respect to engine shaft in forward direction and for energizing the field element from the exciter to increase the speed of load shaft in a forward direction.

32. The means for varying the speed and torque between a pair of shafts which includes an engine having a shaft, a load shaft, a dynamo connected with the engine shaft in fixed speed relation thereto and having an armature and a field coil, a second dynamo having an armature, a regulating dynamo adapted to be traversed by a substantial portion of load current, a series load circuit including both armatures and the regulating dynamo, a differential gearing connected with the shafts and with the second dynamo cooperating with the dynamos to transmit power between the shafts, and means for energizing the field coil from one of the armatures in one direction when the speed of the load shaft is relatively low and for energizing the field coil in the opposite direction from the regulating dynamo when the speed of the load shaft is relatively high.

33. Apparatus for transmitting power in both directions between an engine and a load, said apparatus including two separate dynamos each having a field winding, a regulating dynamo and means including a switch for connecting said regulating dynamo in parallel circuit relation with one of said field windings in one position of said switch, connecting said regulating dynamo in paralleling circuit relation with the other of said field windings in another position of said switch and connecting said regulating dynamo in parallel circuit relation with both of said field windings in still another position of said switch.

34. Apparatus for transmitting power in both directions between an engine and a load, said apparatus including an engine having a throttle and a shaft, a load shaft, means including two separate dynamos electrically inter-connected for transmitting power between said shafts, a switch responsive to the movement of said throttle mechanism, and means controlled by said switch for establishing power flow from said load shaft to said engine shaft in one position of said switch, for establishing power flow from said engine shaft to said load shaft when said switch is in another position and for interrupting power flow between said shafts when said switch is in still another position.

35. Apparatus for transmitting power between an engine and a load said apparatus including an engine, a load shaft, a power transmitting load circuit including dynamo electric apparatus, a regulating dynamo connected in said load circuit and connected in fixed speed relation with the load shaft, and means including the armature of said regulating dynamo connected in said load circuit for changing the torque ratio between said engine and load in response to changes in the speed of said load shaft.

36. Apparatus for transmitting power from an engine to a load including an engine, a load shaft, a power transmitting dynamo having a field winding, a regulating dynamo connected in parallel with said field winding and having its resistance in predetermined proportion to the resistance of said field winding for establishing a predetermined maximum torque ratio between said engine and said load shaft when said load shaft is at rest, and means including said regulating dynamo for varying said torque ratio in response to the speed of said load shaft.

37. A system for transmitting power from a load member to an engine for braking said load member by engine friction, said system including a power dynamo having a field winding, a regulating dynamo connected in fixed speed relation with said load member, an electric power transmission load circuit including said field winding and said regulating dynamo, connected in parallel circuit relation with each other said regulating dynamo having predetermined resistance and voltage characteristics with respect to the resistance of and voltage drop across said field winding for limiting the magnitude of engine friction braking at relatively high speeds of said load member and for varying said engine friction braking at other speeds of said load member.

38. Apparatus for transmitting power from an engine to a load member, said apparatus including an engine having a throttle, a load member, a power transmitting dynamo associated with the engine and having a field winding, a regulating dynamo connected in fixed speed relation with said load member, an electric power transmitting load circuit including said field winding and said regulating dynamo connected in parallel circuit relation with each other, said regulating dynamo having predetermined resistance and voltage characterics with respect to the resistance of and voltage drop across said field winding for increasing engine speed with increase in the opening of said engine throttle and for decreasing engine speed with decrease in the opening of said throttle, independent of the speed of said load member.

39. Apparatus for transmitting power in both directions between an engine and a load said apparatus including an engine having a throttle mechanism, a load member, dynamo electric apparatus connected with said engine and said load member, switching means operated by said throttle mechanism, and means controlled by said switching means responsive to the movement of said throttle mechanism toward the closed or idling position for controlling said dynamo apparatus to electrically brake said load by the friction of said engine.

40. Apparatus for transmitting power in both directions between an engine and a load said apparatus including an engine having a throttle mechanism, a load member, dynamo electric apparatus connected with said engine and said load member, switching means operated by said throttle mechanism, and means controlled by said switching means responsive to the movement of said throttle mechanism toward the closed or idling position for controlling said dynamo apparatus to electrically brake said load by the friction of said engine, and additional switching means for establishing said braking of a different magnitude.

41. The means for variously driving and braking a load with an internal combustion engine which includes an engine having a throttle mechanism and a shaft, a load shaft, a dynamo connected in fixed speed relation with the engine shaft having an armature and a field coil, a second dynamo connected with the load shaft having an armature and a field coil, means for connecting the field coils in series circuit relation with each other and with the armatures, means including an exciter and a switch for establishing power flow from engine shaft to load shaft when the throttle is moved towards an open position and to establish power flow from load shaft to engine shaft to brake the load when the throttle is moved towards a closed position and additional means including another switch for securing a different degree of braking with a change in ratio of the speed of engine shaft with respect to the speed of load shaft.

42. The means for variously driving and braking a load with an internal combustion engine which includes an engine having a throttle mechanism and a shaft, a load shaft, a dynamo connected in fixed speed relation with the engine shaft having an armature and a field coil, a second dynamo connected with the load shaft having an armature and a field coil, means for connecting the field coils in series circuit relation with each other and with the armatures, means including a switch for permitting driving the load shaft from the engine shaft when the throttle is opened and for permitting driving the engine shaft from the load shaft and to brake the load when the throttle is substantially closed, and additional means including a switch for establishing a different degree of said braking with a change in the speed of said engine shaft with respect to the speed of said load shaft.

43. The means for variously driving and braking a load with an internal combustion engine which includes an engine having a throttle control mechanism and a shaft, a load shaft, a dynamo connected in fixed speed relation with the engine shaft, a second dynamo electrically connected with the first dynamo, a differential gearing connected with the shafts and with the second dynamo and adapted to transmit power between the shafts, means including an exciter and also a switch operative in response to movements of the throttle control mechanism for establishing power flow from engine shaft to load shaft when the throttle control mechanism is moved towards an open throttle position and for establishing power flow from load shaft to engine shaft to brake the load when the throttle control mechanism is moved towards a closed throttle position and additional means including a second switch for varying the speed ratio between the shafts to change the degree of load shaft braking.

44. A system having a means including dynamo electric apparatus for transmitting power in both directions between an engine and a load, said system including an engine member, a load member, an auxiliary generator connected in fixed speed relation with said load member, and means including said auxiliary generator for causing the driving of said engine from said load member for braking said load by engine friction.

45. A system having means including dynamo electric apparatus for transferring power in both directions between an engine and a load, said system including an engine member, a load member, an auxiliary generator connected in fixed speed relation with said load member, and means including said auxiliary generator for limiting said power transfer during engine friction braking when the speed of the load member is relatively high and for maintaining said engine friction braking when the speed of said load member is relatively low.

46. A system having means including two dynamos for transmitting power in both directions between an engine and a load, said system including an engine member, a load member, an auxiliary generator connected in fixed speed relation with said load member, and means including said auxiliary generator for causing one of said dynamos to operate as a generator driven by said load member and for permitting the other of said dynamos to operate as a motor driven by said generator for driving said engine.

47. A system having means including two dynamos for transmitting power in both directions between an engine and a load member, said system including an auxiliary generator connected in fixed speed relation with said load member, and means including said auxiliary generator for causing one of said dynamos to operate as a generator and for permitting the other of said dynamos to be operated as a motor driven by said generator in one direction of power transmission and in the opposite direction of power transmission for causing the second mentioned dynamo to operate as a generator, and for permitting the first mentioned dynamo to operate as a motor driven by said last-mentioned generator.

48. A system having means including dynamo electric apparatus for transmitting power from an engine to a load, said system including an engine member, a load member, a power dynamo connected with said load member, another power dynamo physically substantially larger than said first mentioned dynamo and normally connected as a motor and connected in fixed speed relation with said engine member, an auxiliary generator connected in fixed speed relation with said load member, and means including said auxiliary generator for causing said large dynamo to operate as a generator for driving said load member at speeds in excess of said engine member.

49. Apparatus for transmitting power from an engine to a load said apparatus including an engine member, a load member, at least one power dynamo, an auxiliary dynamo connected in fixed speed relation with said load member, and means including said auxiliary dynamo for weakening said power dynamo when the load member is at rest for rendering said transmission apparatus operative to start movement of said load member.

50. Apparatus for transmitting power from an engine to a load, said apparatus including an engine member, a load member, at least one power transmitting dynamo having a field winding, an auxiliary dynamo connected in fixed speed relation with said load member and means including said auxiliary dynamo connected in parallel circuit relation with said field winding for rendering said transmission apparatus operative to start movement of said load member.

51. A system for transmitting power between an engine and a load, said system including an engine, a load member, at least one power dynamo having a field winding, an auxiliary dynamo connected in fixed speed relation with load member, and means for connecting said auxiliary dynamo in parallel circuit relation with said field winding for rendering the transmission system inoperative when the load member is at rest.

52. A system for transmitting power between an engine and a load, said system including an engine having a throttle mechanism, a load member, at least one power dynamo having a field winding, an auxiliary dynamo connected in fixed speed relation with said load member, and means responsive to movement of said throttle mechanism for connecting said auxiliary dynamo in parallel circuit relation with said field winding for rendering said transmission system inoperative when the load member is at rest.

53. A system for transmitting power including a power shaft, a load shaft, a plurality of separate dynamo electric machines connected with said power shaft, a load circuit connecting said machines, one of said machines generating an opposing voltage in excess of that of another and provided with a field winding connected in said load circuit in a direction to prevent establishment of substantial current in said load circuit to render said transmission system inoperative.

54. A system for transmitting power between an engine and a load, said system including an engine having a throttle mechanism, a plurality of separate dynamo electric machines, a load circuit connecting said machines, one of said machines being physically larger than another, means including a series field coil on said larger machine for rendering said transmission system inoperative, and means responsive to the movement of said throttle mechanism for rendering said transmission system operative.

55. A system for transmitting power including an engine having a throttle mechanism, two separate dynamo electric machines, each connected with said engine, a load circuit connecting said machines, one of said machines being physically larger than the other and generating an opposing voltage in excess of that of the other to render said system inoperative, and means responsive to the movement of said throttle mechanism for increasing the voltage of the smaller machine to render said transmission system operative.

56. A system for transmitting power including an engine, a load member, and means for rendering said transmission system inoperative when said engine idles and the load member is at rest including two separate dynamo electric machines each driven by said engine, each having series field windings and armatures all connected in series circuit relation with one another, one of said machines being physically larger than the other and generating an opposing voltage in excess of that of the other and having its series field winding connected in motoring direction.

57. Apparatus for transmitting power from a load to an engine for braking the load by engine friction including a load member, an engine having a member, a power dynamo rotatively connected by differential gearing with both members, an auxiliary generator connected in fixed speed relation with said load member, means including said auxiliary generator for causing said power dynamo to operate as a generator driven by said load member, a separate power dynamo physically substantially larger and of greater torque capacity than said first mentioned power dynamo and rotatively connected with said engine member, and means for driving said larger dynamo as a motor with current from said first-mentioned power dynamo.

58. Apparatus for starting an engine and for transmitting power between an engine and a load including an engine, a load member, a dynamo connected in fixed speed relation with said engine and having a field element provided with a field coil normally connected as a series motor for driving the load member in a forward direction, a battery, and means including said battery and said dynamo for starting said engine, and means for reversing the current in said field coil while maintaining said series motor connection intact for converting the motor to a generator when transmitting power from the engine to the load member.

59. Apparatus for transmitting power between an engine and a load including an engine having a throttle mechanism, a load member, a dynamo electric machine connected in fixed speed relation with said engine and normally connected as a series motor for driving said load member in forward direction, a battery, switching means when in one position for connecting said motor to a battery for starting said engine and when in another position to include said motor in said transmission apparatus for rendering said transmission apparatus inoperative, and means connected with said engine throttle mechanism for rendering said transmission apparatus operative.

60. A system for transmitting power in both directions between an engine and a load and for reversing the direction of rotation of a load shaft with respect to an engine shaft, said system including an engine having a throttle mechanism, a load shaft, two power dynamos each having an armature and a field winding all connected in series circuit relation with each other, one of said dynamos being substantially physically larger than the other smaller dynamo, the large dynamo having a stationary field member and a rotating armature connected in fixed speed relation with said engine and connected also with a sun-gear, said smaller dynamo having a stationary field member an a rotating armature connected with a sun-gear relatively smaller than the first-mentioned sun-gear, planetary gears meshing with said large and small sun-gears and carried by said load shaft, switching means mechanically connected with said engine throttle mechanism and electrically connected with an auxiliary dynamo, said auxiliary dynamo being mechanically connected in fixed speed relation with said load shaft, means including said switching means for connecting said auxiliary dynamo in parallel circuit relation with the field winding of one of said power dynamos when the switching means is in one position, for connecting the auxiliary dynamo in parallel circuit relation with both of said field windings in another position, and for connecting said auxiliary dynamo with the field winding of the other power dynamo in still another position, means including a reversing switch for reversing the field winding of each power dynamo with respect to its armature for driving said load shaft in said reverse direction and means for stabilizing said system when the load shaft is at rest.

61. In combination, an engine having a throttle mechanism and a shaft, a load shaft, two electrically interconnected dynamos for transmitting power between the shafts, and means operated by movement of the throttle mechanism for establishing unidirectional flow of power from the engine shaft to the load shaft when the throttle mechanism is in one position and for establishing unidirectional flow of power from the load shaft to the engine shaft when the throttle mechanism is in another position.

62. In combination, an engine having an accelerator and a shaft, a load shaft, a generator driven by said engine shaft, a series motor connected to said load shaft, a transmission circuit for driving said motor from said generator, and means responsive to movement of said accelerator to idling position for changing the operation of said series motor to a generator.

63. In combination, an engine having an accelerator and a shaft, a load shaft, a dynamo driven by said engine shaft, a second dynamo connected to said load shaft, a transmission circuit connecting said dynamos, and means controlled by said accelerator when in throttle open position for driving the second dynamo as a motor from the first dynamo, for driving the first dynamo as a motor from the second dynamo when in idling position, and for preventing power flow in either direction when in an intermediate position.

ALFONS H. NEULAND.

CERTIFICATE OF CORRECTION.

Patent No. 2,000,786.  May 7, 1935.

ALFONS H. NEULAND.

It is hereby certified that error appears in the printed specification of the above numbered patent requiring correction as follows: Page 7, second column, line 30, claim 14, before "two" insert the words means including; and that the said Letters Patent should be read with this correction therein that the same may conform to the record of the case in the Patent Office.

Signed and sealed this 9th day of July, A. D. 1935.

Bryan M. Battey (Seal)  Acting Commissioner of Patents.